United States Patent [19]

Subramanian

[11] Patent Number: 4,534,485

[45] Date of Patent: Aug. 13, 1985

[54] PRESSURE COOKERS HAVING VENT MEANS

[76] Inventor: Naranammalpuram S. Subramanian, C-21-22 U-Road, Wagle Estate, Thana 400604, State of Maharashtra, India

[21] Appl. No.: 653,544

[22] Filed: Sep. 24, 1984

[51] Int. Cl.$^3$ ............................................. B65D 51/16
[52] U.S. Cl. ..................................................... 220/203
[58] Field of Search ............... 220/203, 303, 293, 295, 220/231, 367; 137/529, 534, 532

[56] References Cited

U.S. PATENT DOCUMENTS

| | | | |
|---|---|---|---|
| 3,949,781 | 4/1976 | Scalabrin | 220/203 |
| 4,160,462 | 7/1979 | Ressi-Ashton | 137/529 |
| 4,251,007 | 2/1981 | Behnisch | 220/203 |
| 4,330,069 | 5/1982 | Bauer | 220/203 |

Primary Examiner—George T. Hall
Attorney, Agent, or Firm—B. K. Niyogi

[57] ABSTRACT

In and for a pressure cooker having an open mouth vessel and a lid which can be sealingly fitted to the mouth of the vessel, a pressure regulating valve fitted to the lid of the vessel comprises a vent tube and a vent weight which vent weight is adapted to be seated over the mouth of the vent tube, said vent tube having a downwardly extending pin to slide into a bore of the head of the vent tube, the vent weight having one or more openings for the escape of the steam when the vent weight is lifted, the vent weight being held by a fulcrumed lever having a passage exposed at one end to the atmosphere and at the other end cooperating with the said openings of the vent weight, the bore or passage of the vent tube being larger in diameter than the said bore or mouth of the vent tube on which the said pin of the vent weight seats, the said pressure regulating valve capable of being manually and automatically operated.

7 Claims, 6 Drawing Figures

PRESSURE COOKERS HAVING VENT MEANS

FIELD OF THE INVENTION

This invention relates to pressure cookers generally used for cooking foodstuff.

BACKGROUND OF THE INVENTION

A pressure cooker comprises an open mouth vessel and a lid which can be sealingly fitted to the mouth. In the lid is fitted a pressure regulating valve which comes into operation when the steam pressure within the vessel exceeds a desired limit. The valve exhausts the steam through a vent tube on which is fitted a vent weight.

It has been experienced that the vent tube sometimes tends to get clogged with particles of food being cooked. The result is that the vent tube and the vent weight become ineffective. This can lead to explosion hazards.

The vent weight due to high temperature in the pressure cooker becomes very hot so that it cannot be removed by hand, but even if it is removed for example, by a tool, the clogged material in the passage of the vent tube is not noticed and cannot be easily removed.

The object of the present invention is to provide a pressure cooker in which the vent tube and the vent weight are so designed that the possibility of clogging of the vent tube is substantially eliminated.

A further object of this invention is to provide means with the pressure cooker whereby the operator can determine whether the vent tube is functioning effectively such that there is no clogging of the vent tube and the cooking in the vessel is proceeding in the normal manner.

It is another object of this invention that it should be possible to maintain substantially constant pressure in the vessel so that the food is cooked at the desired pressure.

SUMMARY OF THE INVENTION

According to this invention there is provided in and for the pressure cooker, a pressure regulating valve which is fitted to the lid of the vessel and comprises a vent tube and a vent weight which vent weight is seated over the upper end of the vent tube, said vent weight having a downwardly extending pin to slide through a vertical bore in the head of the vent tube, the base of the vent weight from which the pin extends having one or more openings for the escape of steam when the vent weight is lifted, the vent weight being held by a fulcrumed lever which has a passage exposed at one end to the atmosphere and at the other end to the said opening or openings in the vent weight so that when the fulcrumed lever is manually operated it will cause the pin to be lifted to release the vertical bore of the vent tube thereby allowing the steam to escape into the atmosphere or when the pressure of the steam developed in the vessel exceeds a desired limit, the vent weight is lifted to allow the steam to be released through the vertical bore of the vent tube, the opening/openings in the vent weight and the passage in the fulcrumed lever being exposed to the atmosphere.

In the upper end or head of the vent tube is formed a bore for a pin of the vent weight to slide in the vent tube. Below this bore for the entry of the pin of the vent weight, the inside diameter of the vent tube is made larger than the bore for the entry of the pin so that foreign matter if any that has entered the vent tube will not clog the passage of steam.

At the lower end of the vent tube is fitted a nut having one or more holes for the passage of the steam into the vent tube. The pin of the vent weight is pointed to engage the bore at the upper end of the vent tube.

The fulcrumed lever firmly holds the vent weight and is so arranged in the handle of the vessel that the operator can press its free end to cause the pin of the vent weight to expose the bore of the vent tube thereby allowing the steam to escape through a passage in the head of the fulcrumed lever which will indicate that the pressure cooker is functioning properly. The said passage in the fulcrumed lever is inclined so that the steam is ejected away from the operator.

BRIEF DESCRIPTION OF THE DRAWINGS

In the accompanying drawings we have illustrated the features of the invention.

Referring to the drawings.

DETAILED DESCRIPTION OF THE INVENTION

While referring generally to all the components which form the pressure cooker, I will describe more specifically the salient features of the improved construction.

Figure 5:
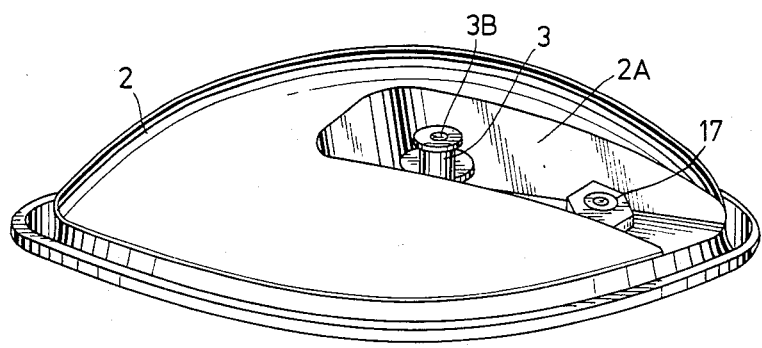
FIG. 5 shows a perspective view of the lid of the pressure cooker.

In the lid 2 of the pressure cooker which is slightly dome shaped there is formed a depression marked 2A (FIG. 5) for the convenience of accommodating the various components hereinafter described.

In the lid 2 there is fitted a vent tube 3 which partially extends into the vessel 4 and partially extends above the lid 2.

At the upper end of the vent tube 3 is formed a vertical bore 3B while the bore 3A of the vent tube 3 below the said bore 3B is of much larger diameter. The portion of the vent tube 3 which extends below the lid 2 into the vessel 4 is covered at its lower end by a nut 3D in which are formed a series of holes 3C through which the steam developed within the vessel 4 enters the vent tube 3. 3E shows the sealing ring between the nut 3D and the lid 2.

Figure 2:
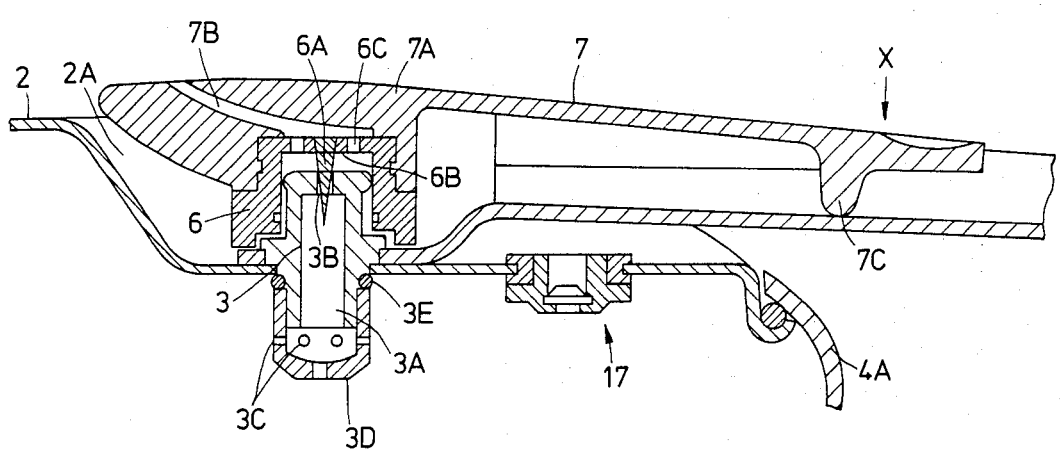
FIG. 2 shows in section the lid with the vent tube, the vent weight and the fulcrumed lever and a part of the vessel in section.
Figure 3:
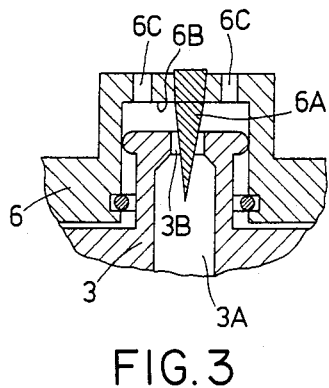
FIG. 3 shows in section only a part of the vent tube and the vent weight.
Figure 6:
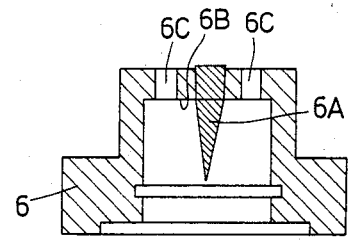
FIG. 6 shows the sectional view of the vent weight.

Reference numeral 6 indicates the vent weight having a downwardly extending pin 6A which enters the opening 3B at the top of the vent tube 3 and may extend substantially downward as illustrated in FIGS. 2 and 3.

The pin 6A extends below the base 6B of the vent weight 6 in which base are formed one or more openings 6C for the escape of steam.

The vent weight 6 is firmly held at the end 7A of a fulcrumed lever 7. In this end of the fulcrumed lever 7 is formed a sloping passage 7B which is in communication with the opening 6C of the vent weight 6.

The pin 6A which depends from the vent weight 6 and enters the bore 3B of the vent tube is of tapered section. The object of making it in tapered section is that it always keeps the opening at the head of the vent tube free of any clogging by particles of food which may enter the vent tube 3. Further due to enlarged section of the passage or bore 3A of the vent tube 3 no clogging can take place because of the larger diameter, the said clogging being further prevented by the provision of the nut 3D.

In actual operation when the fulcrumed lever 7 which is fulcrumed at 7C is pressed down as indicated by arrow X, the vent weight 6 which is held to the lever 7 moves up thereby allowing the steam from within the vessel to escape first through the openings 3C, then through opening 3B and thereafter through opening 6C, finally escaping through the passage 7B in the head of the lever 7.

As soon as the pressure within the vessel 4 is stabilised, that is the pressure within the vessel 4 falls below a certain value such as 15 p.s.i. the vent weight will come down with the pin 6A of the vent weight 6 occupying the seat in the opening 3B of the vent tube 3 so that the pressure within the vessel is normalised and the cooking can carry on.

The same process is repeated when the pressure within the vessel exceeds a certain limit, for example when the pressure within the vessel 4 is above 15 p.s.i. Due to the pressure built up in the vessel 4, the vent weight 6 will automatically lift up allowing escape of the excess steam.

The passage 7B is inclined so that it allows the steam escaping through the same to be ejected away from the operator. In experiments it has been found that the sound which is developed with the escape of steam is in the form of periodical puffs, accompanied by visible up and down movement of the vent weight 6 fitted to the fulcrumed lever 7. This ensures the operator that the pressure cooker is functioning well.

Figure 1:
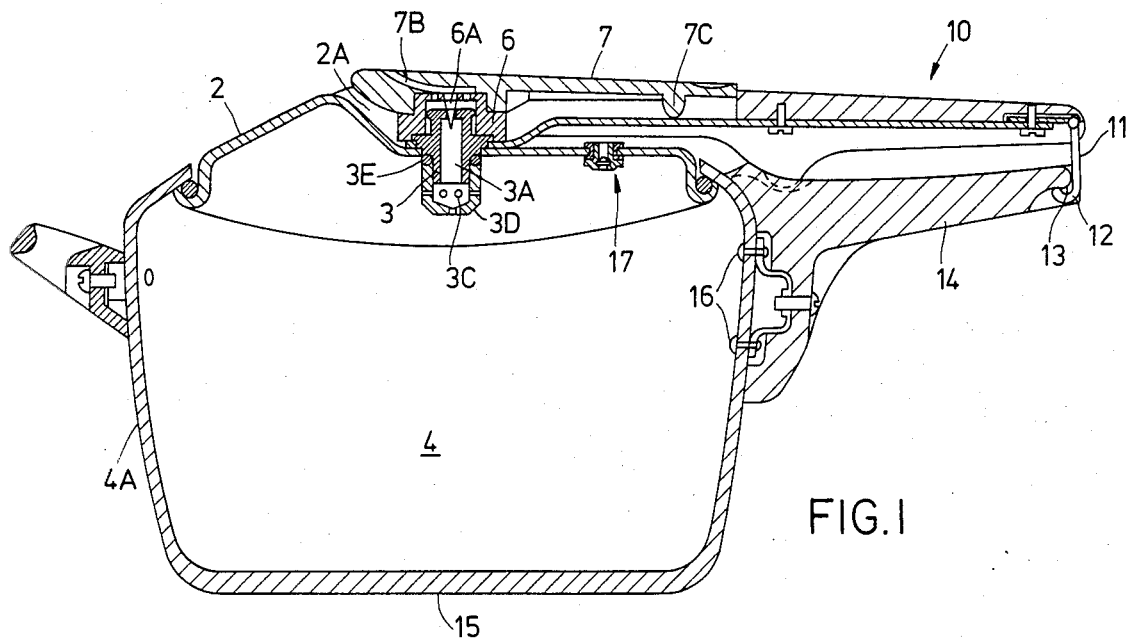
FIG. 1 shows a sectional elevation of the pressure cooker of this invention illustrating particularly and shown in section are the vent tube, the vent weight and the fulcrumed lever.

The fulcrumed lever 7 can be fitted in any manner and in accordance with one embodiment as shown in FIG. 1 it is fitted in a channel formed in the handle 10 which has a latch 11 whose latching end 12 slips over the rounded end 13 of a bracket or handle 14 which is secured to the vessel 4 by means of rivets 16.

According to another feature of this invention as can be seen from FIG. 1, the vessel 4 has a thick base 15 which is thicker than the side wall 4A.

Figure 4:
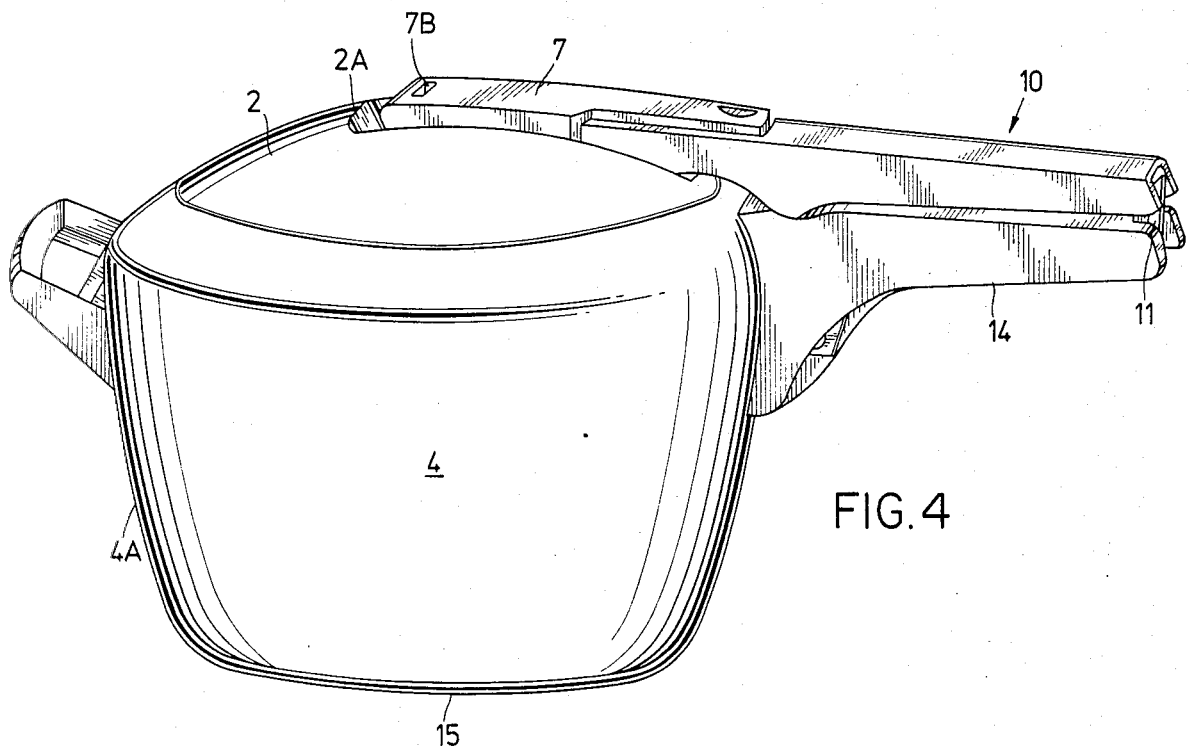
FIG. 4 shows the pressure cooker of this invention in the assembled condition.

The vessel 4 is made of a tapering shape (see FIGS. 1 and 4).

In addition to the vent tube and the vent weight which are provided for the safety of operation of the pressure cooker there is provided a safety plug 17 fitted to the lid 2 made of a soft metal which will melt and eject in the event of excessive pressure developed in the vessel and allow the escape of steam affording the additional safety measure as is well-known in the art.

After having ascertained the invention what I claim to be new is:

1. In and for a pressure cooker, a pressure regulating valve which is fitted to the lid of the vessel comprising a vent tube and a vent weight which vent weight is seated over the upper end of the vent tube, said vent weight having a downwardly extending pin to slide through a vertical bore in the head of the vent tube, the base of the vent weight from which the pin depends having one or more openings for the escape of steam when the vent weight is lifted, the vent weight being held by a fulcrumed lever which has a passage exposed at one end to the atmosphere and at the other end to the said opening or openings in the vent weight so that when the fulcrumed lever is manually operated it will cause the pin to be lifted to release the vertical bore of the vent tube thereby allowing the steam to escape into the atmosphere or when the pressure of the steam developed in the vessel exceeds a desired limit, the vent weight is lifted to allow the steam to be released through the vertical bore of the vent tube, the opening/openings in the vent weight and the passage in the fulcrumed lever being exposed to the atmosphere.

2. A pressure cooker as claimed in claim 1 in which in the head of the vent tube is formed a bore or passage for the pin of the vent weight to slide in the vent tube.

3. A pressure cooker as claimed in any one of the previous claims in which below the bore or the passage for the entry of the pin of the vent weight, the inside diameter of the vent tube is made much larger than the said bore or passage for the entry of the pin.

4. A pressure cooker as claimed in any one of the previous claims in which at the lower end of the vent tube is fitted a nut having one or more holes for the passage of the steam into the vent tube.

5. A pressure cooker as claimed in claim 1 in which the fulcrumed lever firmly holds the vent weight and is so arranged in the handle of the vessel that the operator can press the free end to cause the pin of the vent weight to expose the bore of the vent tube thereby allowing the steam to escape through the passage in the head of the fulcrumed lever.

6. A pressure cooker as claimed in claim 1 in which the passage in the fulcrumed lever is inclined so that the steam allowed to escape from the vessel is ejected away from the operator.

7. A pressure cooker as claimed in claim 1 in which the vessel is made of a tapering shape.

* * * * *